United States Patent
Scholz (10) Patent No.: US 9,303,685 B2
(45) Date of Patent: Apr. 5, 2016

(54) FITTING FOR A VEHICLE SEAT AND VEHICLE SEAT

(71) Applicant: KEIPER GMBH & CO. KG, Kaiserslautern (DE)

(72) Inventor: Grit Scholz, Remscheid (DE)

(73) Assignee: KEIPER GMBH & CO. KG, Kaiserslautern (DE)

( * ) Notice: Subject to any disclaimer, the term of this patent is extended or adjusted under 35 U.S.C. 154(b) by 58 days.

(21) Appl. No.: 14/353,374

(22) PCT Filed: Oct. 23, 2012

(86) PCT No.: PCT/EP2012/004425
§ 371 (c)(1),
(2) Date: Apr. 22, 2014

(87) PCT Pub. No.: WO2013/060443
PCT Pub. Date: May 2, 2013

(65) Prior Publication Data
US 2014/0284982 A1    Sep. 25, 2014

(30) Foreign Application Priority Data

Oct. 25, 2011   (DE) .......................... 10 2011 117 392
Jan. 6, 2012    (DE) .......................... 10 2012 000 296

(51) Int. Cl.
*F16C 17/12*   (2006.01)
*B60N 2/225*   (2006.01)
*F16C 17/06*   (2006.01)

(52) U.S. Cl.
CPC ................ *F16C 17/12* (2013.01); *B60N 2/225* (2013.01); *B60N 2/2252* (2013.01); *F16C 17/065* (2013.01)

(58) Field of Classification Search
CPC ..... F16C 17/12; F16C 17/065; B60N 2/2252; B60N 2/225

USPC ................................................ 297/367 R, 362
See application file for complete search history.

(56) References Cited

U.S. PATENT DOCUMENTS

| | | |
|---|---|---|
| 5,452,938 A | 9/1995 | Ernst |
| 2011/0140494 A1* | 6/2011 | Krueger et al. ........... 297/362 X |
| 2011/0169312 A1 | 7/2011 | Desquesne et al. |

FOREIGN PATENT DOCUMENTS

| | | |
|---|---|---|
| DE | 44 11 214 A1 | 10/1995 |
| DE | 195 48 809 C1 | 5/1997 |

(Continued)

OTHER PUBLICATIONS

Japanese Office Action issued in co-pending Japanese Application No. 2014-534967 mailed Feb. 17, 2015.
(Continued)

*Primary Examiner* — Anthony D Barfield
(74) *Attorney, Agent, or Firm* — Foley & Lardner LLP (57) ABSTRACT

A fitting for a vehicle seat, such as a motor vehicle seat, includes a first fitting part, on which a ring gear is formed, and a second fitting part, on which a spur gear is formed, which meshes with the ring gear. The two fitting parts are in transmission connection with each other. A rotatably supported eccentric rotates in the circumferential direction for driving a relative rolling motion of the spur gear and the ring gear. The outside of the eccentric is arranged in a plain bearing bushing in the radial direction. The plain bearing bushing is arranged in a bearing seat, such as a collar of the first or second fitting part. The plain bearing bushing has a wall thickness of less than 1 mm and is connected to the bearing seat in a bonded manner by laser welding. A running side of the plain bearing bushing is plastic-coated.

13 Claims, 5 Drawing Sheets

(56) References Cited

FOREIGN PATENT DOCUMENTS

| | | |
|---|---|---|
| DE | 20 2009 07 520 U1 | 9/2009 |
| DE | 10 2008 28 094 A1 | 12/2009 |
| DE | 10 2010 62 414 A1 | 6/2011 |
| DE | 10 2010 13 091 A1 | 9/2011 |
| DE | 10 2012 00 296 A1 | 4/2013 |
| EP | 1 423 294 B1 | 6/2004 |
| JP | 07-279947 A | 10/1995 |
| JP | 11-000010 U | 1/1999 |
| JP | 2010-159809 A | 7/2010 |
| JP | 2010-184035 A | 8/2010 |
| JP | 2011-140299 A | 7/2011 |
| WO | WO-2006/088896 A1 | 8/2006 |

OTHER PUBLICATIONS

International Preliminary Report on Patentability in PCT/EP2012/004425.

International Search Report dated Feb. 11, 2013 received in International Appl. No. PCT/EP2012/004425.

* cited by examiner

FITTING FOR A VEHICLE SEAT AND VEHICLE SEAT

CROSS REFERENCE TO RELATED APPLICATIONS

The present application is a National Stage of International Application No. PCT/EP2012/004425 filed on Oct. 23, 2012, which claims the benefit of German Patent Application Nos. 10 2011 117 392.0 filed on Oct. 25, 2011, and 10 2012 000 296.3 filed Jan. 6, 2012, the entire disclosures of which are incorporated herein by reference.

The invention relates to a fitting for a vehicle seat having a first fitting member on which a toothed ring is formed and a second fitting member on which a toothed wheel is formed and engages with the toothed ring, whereby the two fitting members are connected to each other in gearing terms, and having a rotatably supported eccentric which extends in a peripheral direction for driving a relative rolling movement of the toothed wheel and toothed ring, the eccentric being arranged in a radial direction with the outer side thereof in a plain bearing bush which is arranged in a bearing seat, in particular in an extruded collar of the first or second fitting member.

The invention further relates to a vehicle seat having such a fitting.

PRIOR ART

DE 44 11 214 A1 discloses a fitting for a vehicle seat, in which a plain bearing bush which comprises a rolled multi-layer material is pressed by means of a calibration mandrel into a bearing seat of a finely punched, hardened toothed wheel in an axial direction. In this calibration operation, occurrences of pretensioning are produced in a radial direction between the plain bearing bush and the toothed wheel and act counter to axial drifting. As a result of the trend in automotive engineering towards constantly further increasing strength, whilst at the same time maintaining the structural space or reducing it, thinner plain bearing bushes are required. The rolled plain bearing bushes, with respect to the otherwise hardened components in the force path of the fitting, constitute the softest component of the fitting. A resulting deformation of the plain bearing bush in the event of a crash leads to a loss of coverage and consequently to a loss of carrying action in the tooth arrangement in the region of the tooth engagement between the fitting members. A smaller wall thickness of the plain bearing bush leads to a smaller deformation thereof and consequently to a smaller loss of carrying action. However, a thin wall thickness, in particular of less than 1 mm, leads to the occurrences of radial pretensioning required for the prevention of axial drifting no longer being adequately ensured.

A pressed-in plain bearing bush in a fitting of the generic type is also disclosed in DE 20 2009 007 520 U1.

DE 10 2010 013 091 A1 describes as an axial securing member of a plain bearing bush a positive-locking securing region, which is formed before or after the plain bearing bush has been pressed in and which forms an undercut with respect to the bearing diameter in the tooth member and consequently prevents movement of the plain bearing. The formation of the securing region is limited by the ability of the plain bearing bush material to become shaped. High tolerance requirements on the bearing location require a comparatively complex shaping process.

Owing to the high level of forces which are produced during the introduction of a plain bearing bush into the bearing seat thereof, by means of pressing or deformation, the plain bearing bush must be constructed to be as rigid as possible. The use of plain bearing bushes which comprise a material which is rolled through 360° with unconnected opposing ends, is therefore not possible, or possible only to a very limited extent. The ends are therefore connected to each other in most applications, in particular clinched or laser welded.

A fitting disclosed in DE 10 2008 028 094 A1 provides for a plain bearing ring which is placed externally on an extruded collar to be connected to this extruded collar in a materially integral manner by means of welding, adhesive bonding, soldering or pressing. This materially integral connection is necessary since, with a plain bearing ring which is arranged at the outer side of an extruded collar, the problem arises that in particular no slotted rings can be calibrated since sufficient tensions cannot be built up for engaging securing with frictional force between the plain bearing ring and the extruded collar.

US 2011 0169312 A1 discloses a non-slotted plain bearing ring, which is secured in a non-positive-locking manner to the extruded collar of a fitting member, with the inner diameter thereof being smaller than the extruded collar outer diameter.

The in particular plastics coated running side of the plain bearing rings described in the last two publications mentioned is on the outer periphery thereof. In contrast, the pressed-in plain bearing bushes have the running side in the inner peripheral face.

A welding method known from DE 20 2009 007 520 U1 for a shaft/bush connection cannot be transferred to thin-walled, plastics-coated plain bearing bushes.

Object

An object of the invention is to improve a fitting of the type mentioned in the introduction, in particular to provide a possibility of enabling plain bearings with plain bearing bushes of low wall thickness and a plastics coating of the running face. Furthermore, a costly clinching or laser welding operation of the gap between the opposing ends of rolled plain bearing bushes as required for the assembly and operational strength is intended to be able to be dispensed with. In order to ensure the outward pressing forces of the plain bearing from the bearing seat, no high tolerance requirements in respect of the plain bearing bush and the bearing seat should be required.

Solution

This object is achieved according to the invention with a fitting having a first fitting member on which a toothed ring is formed, a second fitting member on which a toothed wheel is formed and engages with the toothed ring, whereby the two fitting members are connected to each other in gearing terms, and having a rotatably supported eccentric which extends in a peripheral direction for driving a relative rolling movement of the toothed wheel and toothed ring, the eccentric being arranged in a radial direction with the outer side thereof in a plain bearing bush which is arranged in a bearing seat, in particular in an extruded collar of the first or second fitting member, the plain bearing bush being connected to the bearing seat in a materially integral manner by means of laser welding, the plain bearing bush having a wall thickness of less than 1 mm and the running side of the plain bearing bush being coated with plastics material.

It is possible to construct plastics-coated plain bearings with such a thin wall thickness because the plain bearing bush is connected to the bearing seat in a materially integral manner by means of laser welding. The wall thickness of the plain bearing bush does not have to be configured for the required friction forces which have to be applied between the bearing seat and the plain bearing bush. The materially integral securing of the plain bearing bush in the bearing seat further enables the opposing ends of the plain bearing bush to be left unconnected since, owing to the smaller requirements in respect of frictional force, the rigidity requirements in respect of the plain bearing bush can also be smaller. Compared with a purely frictionally engaging connection between the bearing seat and plain bearing bush, the tolerances of the individual plain bearing components are subjected to smaller demands.

In comparison with other welding methods, during the laser welding operation, there is a smaller transfer of energy into the fitting member, the bearing seat and the plain bearing bush and consequently less thermal distortion of the components. The running sides of the plain bearing bushes may be coated with plastics material since the thermal loading during laser welding is correspondingly small and the coating is not thermally destroyed.

In a preferred embodiment, the bearing seat is provided on one of the two fitting members and the plain bearing bush is connected to the bearing seat by means of a laser welding seam in the region of the end face of the plain bearing bush facing away from the other of the two fitting members. Such an arrangement can be accessed particularly well during the welding operation. The laser weld seam may in this instance be constructed so as to be interrupted several times along the in particular circular periphery of the plain bearing bush or be constructed as a peripheral laser weld seam which provides a particularly high level of strength. Three tacking locations which are distributed at an angle of 120° over the periphery of the plain bearing bush are found to be particularly cost-effective.

Preferably, the bearing seat is an extruded collar of the first or second fitting member. This single-piece construction constitutes a very cost-effective bearing seat.

A bearing seat which comprises a separate sleeve which is secured to the first or second fitting member is suitable for producing a fitting member construction kit. The cost-intensive basic geometry of the fitting members in terms of tools is thereby identical for all variants. A variance in the extent of the bearing seat, in particular different axial lengths of the bearing seat, can be produced by means of different sleeves. Extreme bearing seat geometries, which cannot be produced as an extruded collar, can also be produced in a simple manner by the use of sleeves.

It is preferable to use plain bearing bushes which have a cylindrical basic form and both ends of which face each other in an unconnected state. The omission of a connection of the ends, as can be carried out, for example, by means of a clinching connection, reduces the cost of the plain bearing bush considerably.

In order to reduce the component volume of the fitting and in order to increase the strength of the fitting, plain bearing bushes having a wall thickness of approximately 0.5 mm are particularly suitable.

A further increase of the strength counter to axial movement of the plain bearing sleeve from the bearing seat in an axial direction is achieved by turning over one of the two axial ends of the plain bearing bush in a radially outward direction. The plain bearing bush can thereby be supported in an axial direction on the bearing seat. The turning-over can be carried out by means of methods known to the person skilled in the art, in a particularly preferred manner by means of a beading operation.

By the plain bearing edge being turned over at both axial sides, axial run-in locations can be produced, that is to say, axial bearing faces which reduce the actuation torque of the fitting by ensuring a support function (in order to minimize friction) of the two fitting members relative to each other or one of the fitting members with respect to adjacent components which have been moved in relative terms, such as a carrier. With such an embodiment, one of the two ends can be turned over only after the plain bearing bush has been introduced into the bearing seat. However, precisely one of the two turned-over ends is already turned over before the plain bearing bush has been introduced into the bearing seat and consequently acts as an axial stop when the plain bearing bush is introduced into the bearing seat.

FIGURES AND EMBODIMENTS OF THE INVENTION

The invention is explained in greater detail below with reference to five embodiments illustrated in the drawings, in which.

Figure 2:
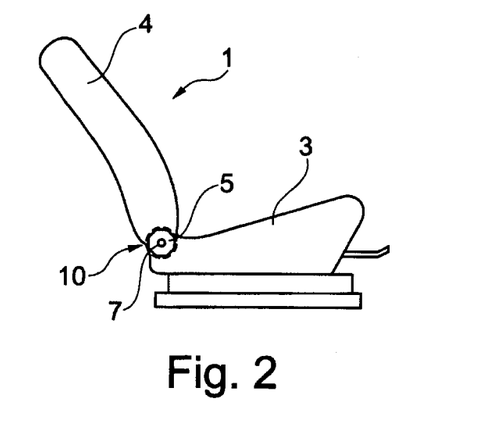
FIG. 2 is a schematic illustration of a vehicle seat having a fitting.

A vehicle seat 1 for a motor vehicle has a seat member 3 and a backrest 4 which can be adjusted in terms of its inclination relative to the seat member 3. In order to adjust the inclination of the backrest 4, a drive shaft 7 which is arranged horizontally in the transition region between the seat member 3 and backrest 4 is rotated manually, for example, by means of a hand wheel 5, or in a motor-driven manner, for example, by means of an electric motor. At both sides of the vehicle seat 1, the drive shaft 7 engages in a fitting 10 in a rotationally secure manner, respectively. In this instance, in the peripheral direction of the drive shaft 7, a small free running angle may be provided between the drive shaft 7 and one of the fittings 10 for tolerance compensation. The drive shaft 7 defines the axis of a cylindrical coordinate system which is used for the directional indications used below. The directional indications are intended to be interpreted in such a broad manner that they remain valid regardless of any slight imprecision resulting from a relative wobbling movement between individual components of the fitting 10 as described below and further include deviations owing to production-related component tolerances.

The fitting 10 has a first fitting member 11 and a second fitting member 12 which can be rotated relative to each other. With the assembly of the fitting 10, the first fitting member 11 is, for example, securely connected to the structure of the backrest 4 of the vehicle seat 1, that is to say, secured to the backrest member. The second fitting member 12 is then securely connected to the structure of the seat member 3, that is to say, secured to the seat member. However, the associations of the fitting members 11 and 12 may also be transposed, that is to say, the first fitting member 11 would then be secured to the seat member and the second fitting member 12 secured to the backrest. The fitting 10 is located in the force path between the backrest and seat member, for which reason the two fitting members 11 and 12 comprise metal, preferably steel.

The fitting 10 is constructed as a gear fitting, in which the first fitting member 11 and the second fitting member 12 are connected to each other by means of a gear mechanism for adjustment and securing, in this instance and in particular by means of a self-locking eccentric planet gear system, as known, for example, from DE 195 48 809 C1, the disclosure of which is expressly incorporated herein by reference.

In the first embodiment (FIGS. 1, 3), the first fitting member 11 has a first flange region 11a and the second fitting member 12 a second flange region 12a which each protrude laterally from a disc-like region of the fitting members 11, 12 and which are used for connection to the seat member 3 and the backrest 4. In order to absorb the axially acting forces, that is to say, to hold together the fitting members 11 and 12, there are provided retention brackets which are not illustrated in FIGS. 1 and 3 and of which one is shown, for example, in EP 1 423 294 B1.

Figure 1:
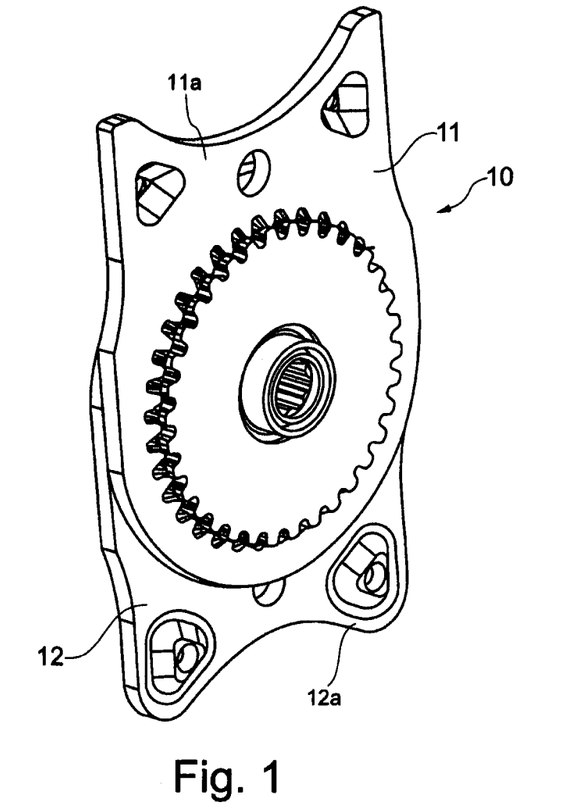
FIG. 1 is a perspective view of the first embodiment.
Figure 3:
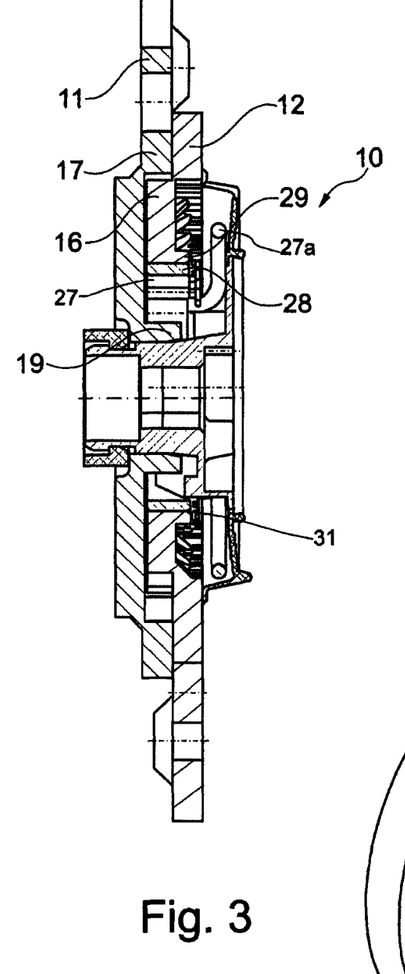
FIG. 3 is an axial section through the first embodiment.

In order to construct the gear, there is formed on the second fitting member 12 an externally-toothed toothed wheel 16 and on the first fitting member 11 an internally-toothed toothed ring 17 which engage with each other. The tip diameter of the externally-toothed arrangement of the toothed wheel 16 is smaller by at least the height of one tooth than the root circle diameter of the internally-toothed arrangement of the toothed ring 17. A corresponding difference of the number of teeth of the toothed wheel 16 and toothed ring 17 of at least one tooth enables a rolling movement of the toothed ring 17 on the toothed wheel 16.

The second fitting member 12 has a bearing seat 29 concentrically relative to the toothed wheel 16. The bearing seat 29 is formed as an extruded collar on the second fitting member 12 and consequently constructed integrally thereon. In an alternative embodiment, the bearing seat is a bearing hole or is secured as a separate sleeve to the second fitting member 12.

On a collar 19 of the first fitting member 11, two wedge segments 27 of an eccentric are supported with the curved inner faces thereof. The second fitting member 12 is supported with the curved outer faces of the wedge segments 27. To this end, the bearing seat 29 of the second fitting member 12 is lined with a plain bearing bush 28 which is secured therein in a materially integral manner and with which the outer faces of the wedge segments 27 are in abutment.

The wedge segments 27 and a spring 27a which pretensions them away from each other define an eccentric which presses the toothed wheel 16 at an engagement location in the toothed wheel 17 in the direction of the eccentricity. When the eccentric is driven, in this instance by means of the drive shaft 7, the wedge segments 27 slide along the plain bearing bush 28, displacing the direction of the eccentricity and consequently displacing the engagement location of the toothed wheel 16 in the toothed ring 17, which can be seen as a wobbling rolling movement, that is to say, as a relative rotation with superimposed wobbling movement between the first fitting member 11 and the second fitting member 12. The inclination of the backrest can thereby be adjusted between several positions for use in a stepless manner.

The plain bearing bush 28 is in this instance slotted, that is to say, two ends of the cylindrical plain bearing face each other without any connection. In modifications of the embodiments, the ends are clinched to each other or the plain bearing bush is constructed as a non-slotted cylinder.

The plain bearing bush 28 is connected to the bearing seat 29 of the second fitting member 12 by means of a peripheral laser weld seam 31 at the end face thereof facing away from the first fitting member 11. In modifications of the embodiment, the plain bearing bush 28 is connected to the bearing seat 29 by means of a laser weld seam at the end face thereof facing the first fitting member 11, or at both end faces. As an alternative to a peripheral laser weld seam, the laser weld seam may comprise a plurality of segment portion seams.

The gear of the second embodiment (FIGS. 4, 5) is constructed substantially in the same manner as that of the first embodiment. However, the two fitting members 11 and 12 are constructed differently with particular regard to the connection to the seat member 3 and the backrest 4. However, owing to the functional similarities, they still have the same reference numerals as those of the first embodiment.

Figure 4:
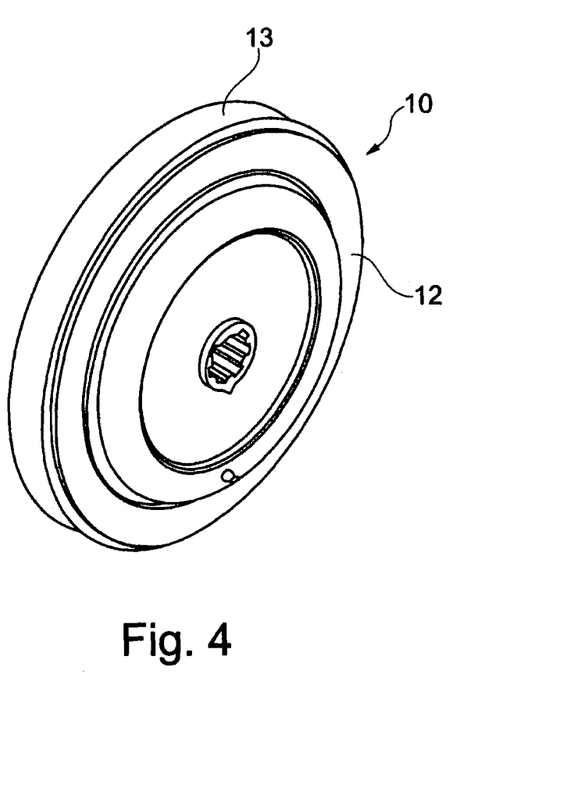
FIG. 4 is a perspective view of the second embodiment.
Figure 5:
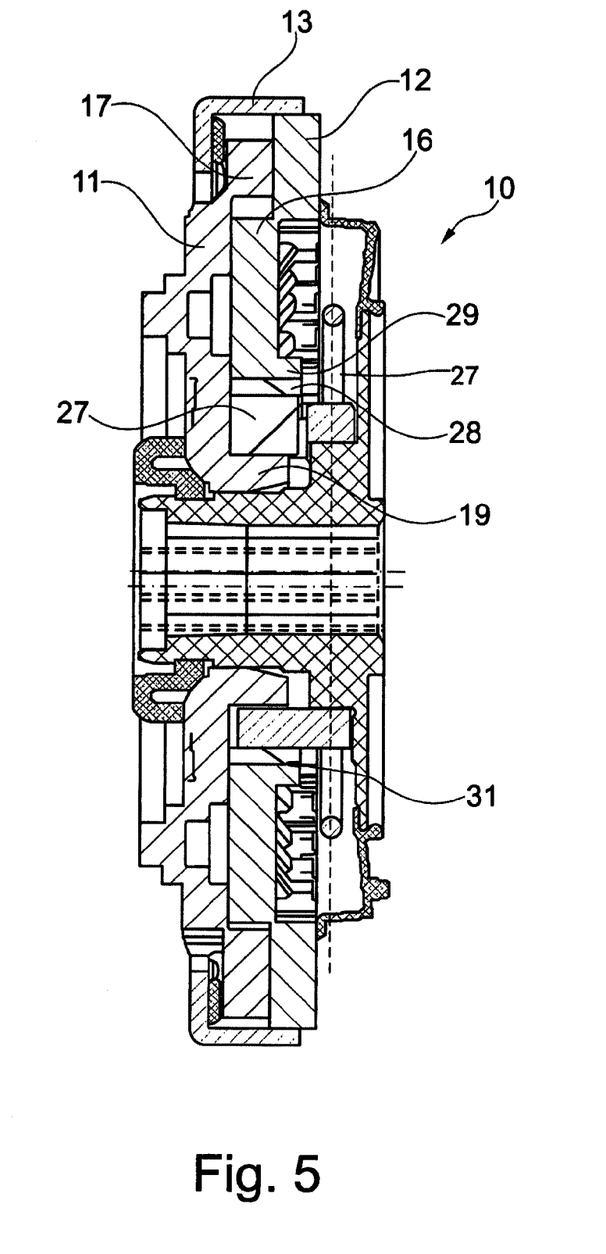
FIG. 5 is an axial section through the second embodiment.

The two fitting members 11 and 12 can be substantially inscribed in the form of a circular disc, and each have geometries, in particular shoulders or cams, in the region of the outwardly directed face thereof for securing to the seat member 3 or to the backrest 4. A surrounding ring 13 is provided in order to receive the axially acting forces, that is to say, to hold together the fitting members 11 and 12. The preferably metal surrounding ring 13 is securely connected, in this instance welded, to the second fitting member 12. By means of a radially inwardly directed edge, the surrounding ring 13, optionally with a separate sliding ring being interposed, engages over the first fitting member 11 which can be moved relative to the ring in a radially outward direction, without impeding the relative rotation of the two fitting members 11 and 12. From a structural viewpoint, the two fitting members 11 and 12 therefore form a disc-like unit together with the surrounding ring 13.

Figure 6:
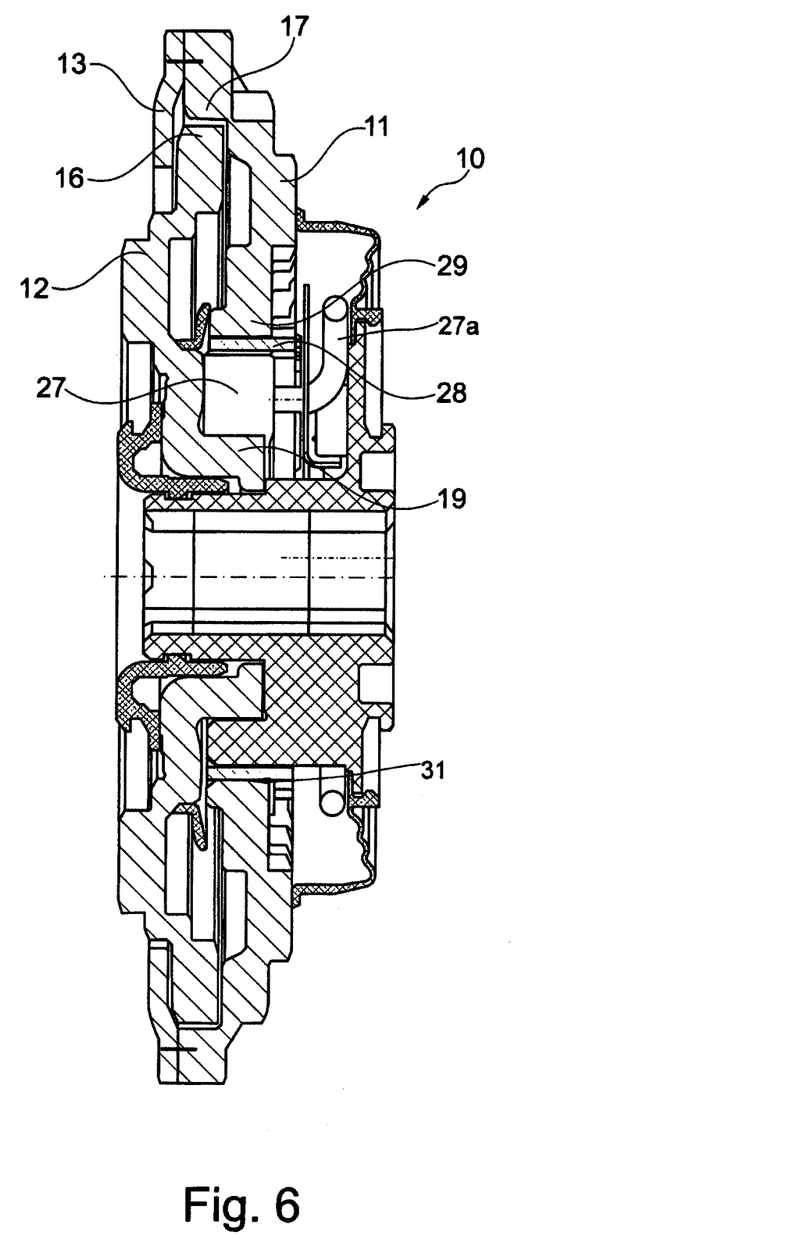
FIG. 6 is an axial section through the third embodiment.

The third embodiment (FIG. 6) corresponds to the second embodiment with regard to the materially integral securing of the plain bearing 28 to the bearing seat 29, but the bearing arrangement with respect to the fitting members is transposed in comparison with the second embodiment. The first fitting member 11 has the bearing seat 29 concentrically relative to the toothed ring 17. The collar 19 is formed as an extruded collar on the second fitting member 12, that is to say, constructed integrally thereon or secured thereto as a separate sleeve.

Figure 7:
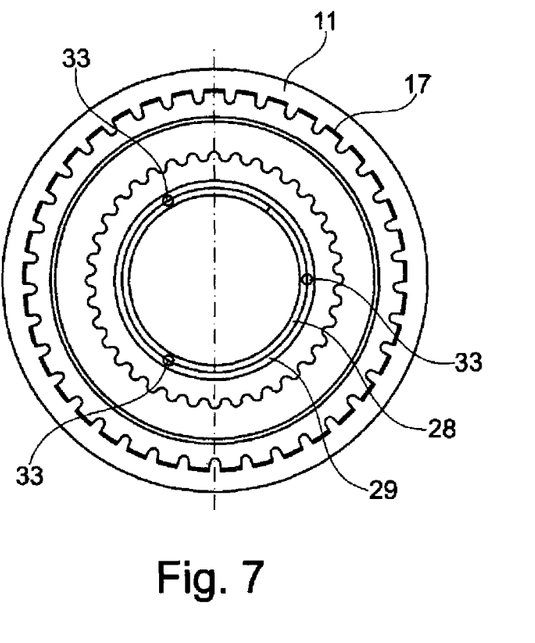
FIG. 7 is a plan view of the first fitting member of the fourth embodiment.

In the fourth embodiment (FIG. 7) which corresponds to the third embodiment with the exception of details of the materially integral connection between the plain bearing bush 28 and the first fitting member 11, the plain bearing bush 28 is connected, in particular laser welded, to the bearing seat 29 of the first fitting member 11 by means of a plurality of, preferably and in this instance three, tacking locations 33 which are distributed over the periphery at an angle of 120°.

In the fifth embodiment (FIG. 8), the cylindrical basic shape of the plain bearing bush 28 has a thin wall thickness of less than 1 mm, in particular approximately 0.5 mm, and has at each of the two axial ends a turned-over edge. To this end, the two axial ends of the plain bearing bush 28, after assembly in the bearing seat 29 and after a laser weld seam 31 has been produced between the plain bearing bush 28 and the bearing seat 29 of the first fitting member 11, are turned over in a radially outward direction, in particular beaded. The plain bearing bush 28 is thereby further connected to the bearing seat 29 in a positive-locking manner and forms an axial bearing face, which reduces the actuation torque of the fitting by ensuring a support function in order to minimize the friction of the two fitting members with respect to each other or one of the fitting members with respect to adjacent components which have been moved in relative terms, such as a carrier.

Figure 8:
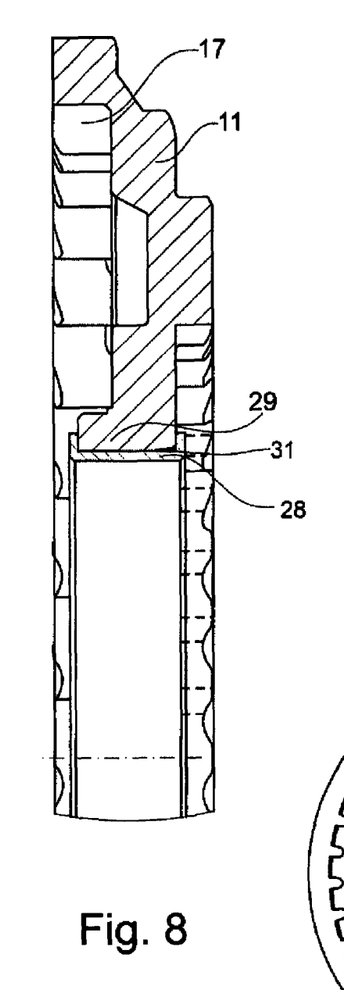
FIG. 8 is an axial section through the first fitting member of the fifth embodiment.

In a modified embodiment, the plain bearing bush 28 already has before the assembly at precisely one axial end an edge which is turned over in a radially outward direction. After being introduced into the bearing seat 29, the opposing axial end is beaded.

The features disclosed in the above description, the claims and the drawings may be significant both individually and together in order to implement the invention in the various embodiments thereof.

LIST OF REFERENCE NUMERALS

1 Vehicle seat
3 Seat member
4 Backrest
5 Hand wheel
7 Drive shaft
10 Fitting
11 First fitting member
11a First flange region
12 Second fitting member
12a Second flange region
13 Surrounding ring
16 Toothed wheel
17 Toothed ring
19 Collar
27 Wedge segment
27a Spring
28 Plain bearing bush
29 Bearing seat, extruded collar
31 Laser weld seam
33 Tacking locations

The invention claimed is:
1. A fitting for a vehicle seat, comprising:
a first fitting member on which a toothed ring is formed;
a second fitting member on which a toothed wheel is formed and engages with the toothed ring, whereby the two fitting members are connected to each other in gearing terms; and
a rotatably supported eccentric which extends in a peripheral direction for driving a relative rolling movement of the toothed wheel and the toothed ring,
wherein the eccentric is arranged in a radial direction such that an outer side of the eccentric is configured to abut an inner side of a plain bearing bush which is arranged in a bearing seat,
wherein the outer side of the eccentric is radially inward of the inner side of the plain bearing bush,
wherein the plain bearing bush has a wall thickness of less than 1 mm and is connected to the bearing seat in a materially integral manner by laser welding,
wherein the running side of the plain bearing bush is coated with plastics material.

2. The fitting as claimed in claim 1, wherein the bearing seat is provided on one of the first and second fitting members and the plain bearing bush is connected to the bearing seat in the region of the end face of the plain bearing bush facing away from the other of the first and second fitting members.

3. The fitting as claimed in either claim 1, wherein the plain bearing bush is connected to the bearing seat by a peripheral laser weld seam.

4. The fitting as claimed in claim 1, wherein the plain bearing bush is connected to the bearing seat by three tacking locations which are distributed at an angle of 120° over the periphery of the plain bearing bush.

5. The fitting as claimed in claim 1, wherein the bearing seat is secured to the first or second fitting member as a separate sleeve.

6. The fitting as claimed in claim 1, wherein the plain bearing bush has a cylindrical basic shape with two ends, wherein the two ends of the plain bearing bush face each other in an unconnected state.

7. The fitting as claimed in claim 6, wherein the two ends of the plain bearing bush face each other in an unconnected state.

8. The fitting as claimed in claim 1, wherein the wall thickness of the plain bearing bush is approximately 0.5 mm.

9. The fitting as claimed in claim 1, wherein the plain bearing bush includes two axial ends along the peripheral direction with a member extending between the two axial ends, wherein one of the two axial ends of the plain bearing bush is bent relative to the member such that the one of the two axial ends extends from the member in a radially outward direction.

10. The fitting as claimed in claim 9, wherein one of the two axial ends of the plain bearing bush is bent relative to the member by beading the radially outward direction.

11. The fitting as claimed in claim 9, wherein both axial ends of the plain bearing bush are bent relative to the member such that both axial ends extend from the member in the radially outward direction.

12. The fitting as claimed in claim 11, wherein precisely one of the axial ends is already bent relative to the member before the plain bearing bush is mounted in the bearing seat.

13. A vehicle seat having a fitting as claimed in claim 1.

* * * * *